Patented Sept. 10, 1963

3,103,521
16-METHYL DERIVATIVES OF ESTRONE
AND ESTRADIOL
Howard J. Ringold and George Rosenkranz, Mexico City, Mexico, assignors, by mesne assignments, to Syntex Corporation, a corporation of Panama
No Drawing. Filed Nov. 12, 1957, Ser. No. 695,494
Claims priority, application Mexico Nov. 13, 1956
6 Claims. (Cl. 260—397.4)

The present invention relates to novel cyclopentanophenanthrene compounds and to a novel process for the production thereof.

More particularly the present invention relates to estrogenic type hormones having the structure of estrane derivatives including substituents at C-3 and C-17 characteristic of these derivatives and in addition a 16-methyl or 16-methylene group. In its more specific aspects the present invention relates to 16-methylene derivatives of estrone and estradiol and 16-methyl derivatives of estrone, estradiol, 17α-lower alkyl estradiol, 17α-vinyl estradiol and 17α-ethinyl estradiol. All of these compounds of the present invention have a lesser estrogenic effect than 16-unsubstituted derivatives while still retaining the other physiological properties such as the anti-androgenic effect of the estrogenic hormones and are therefore obviously especially useful for the treatment of those ailments where, for example, an anti-androgenic effect is desired and an estrogenic effect represents an undesirable side reaction.

In accordance with the present invention it has been discovered that estrone may be reacted with formaldehyde and a dialkylamine to prepare a 16-dialkylaminomethyl-estrone. Upon steam distillation of this last compound there is then produced a key intermediate and estrogenic type hormone, namely 16-methylene-estrone. This compound can be conventionally reduced with lithium aluminum hydride or sodium borohydride to prepare the corresponding 16-methylene-estradiol. The esters of both of these 16-methylene derivatives may be conventionally prepared as well as the 3-alkyl or 3-hydroxy alkyl ethers.

Further in accordance with the present invention by catalytic hydrogenation there may be prepared from 16-methylene-estrone, 16-methyl-estrone which may then be conventionally transformed into 16-methyl estradiol, to 16-methyl-17α-lower alkyl-estradiol, 16-methyl-17α-vinyl-estradiol, 16-methyl-17α-ethinyl-estradiol and various ethers and esters thereof hereinafter described in detail.

Certain of the estrogenic type hormones of the present invention may therefore be defined by the following formula:

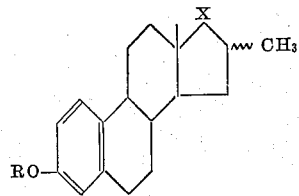

In the above formula R represents hydrogen or an acyl group of a hydrocarbon carboxylic acid of 2 to 12 carbon atoms, such as acetate, propionate, butyrate, trimethyl acetate, phenylpropionate, benzoates, hemisuccinate or cyclopentylpropionate. R may also represent a lower alkyl or hydroxyalkyl group such as methyl, ethyl, propyl or hydroxyethyl. X represents $$=O \text{ or } \diagup OR^1 \diagdown R^2$$

and $R^2$ may be hydrogen, lower alkyl (such as methyl, ethyl or propyl), vinyl or ethinyl, $R^1$ is hydrogen if $R^2$ is other than hydrogen, $R^1$ is hydrogen or an acyl group of a hydrocarbon carboxylic acid of 2 to 12 carbon atoms if $R^2$ is hydrogen.

Other estrogenic type hormones of the present invention are defined by the following formula:

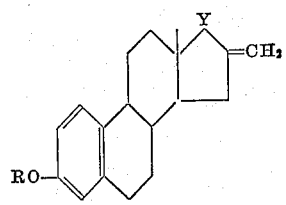

In the above formula R represents the same groups heretofore set forth. Y represents =O, or $OR^3$ and $R^3$ represents hydrogen or an acyl group of a hydrocarbon carboxylic acid of 2 to 12 carbon atoms.

The compounds defined by the above formulas are produced by a novel process outlined in the following equation:

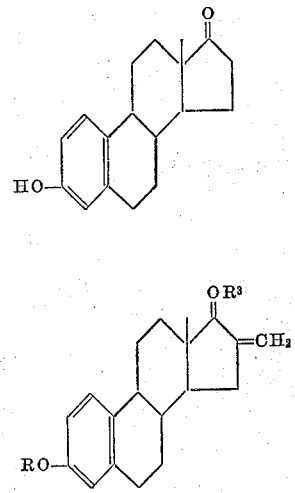
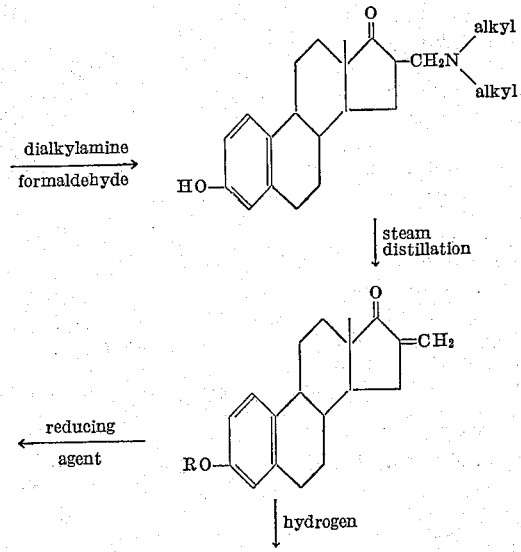

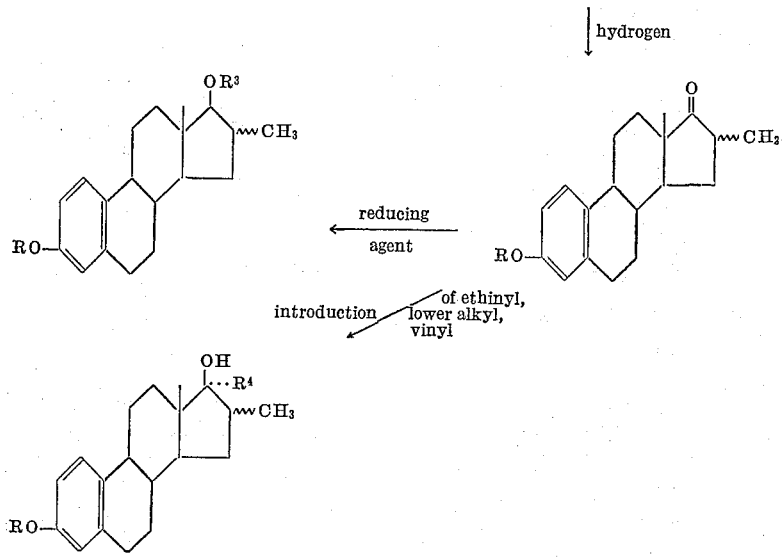

In the above equation R and $R^3$ represent the same groups as heretofore set forth. $R^4$ represents a lower alkyl group, vinyl or ethinyl group.

In practising the process above outlined, estrone is reacted with the dialkylamine in the form of its hydrochloride by admixing, for example, estrone, paraformaldehyde, dry dimethylamine hydrochloride and an organic solvent such as isoamyl alcohol and refluxing for a period of time of the order of 2 hours. The mixture is then concentrated until most of the reaction product precipitated. The product is then treated with alkali to liberate the free base 16-(dimethylamino)-methyl-estrone.

The estrone derivative formed in the first step in water is then steam distilled until the distillate failed to give an alkaline reaction. The precipitate on cooling was 16-methylene-estrone. As indicated in the equation this is an intermediate for the production of the corresponding estradiol compounds since conventional reduction of the 17-keto group with a reducing agent such as lithium aluminum hydride or sodium borohydride gives the corresponding 17β-hydroxy group. Conventional esterification with acid anhydrides or chlorides in pyridine solution gave the corresponding 3-esters of 16-methylene-estrone or the diesters of 16-methylene-estradiol. Conventional methods of etherification such as treatment with lower dialkyl sulfates and alkali gives the corresponding C–3 alkyl ethers and reaction with a lower alkyl monohalogenated alcohol and sodium iodide gives the corresponding lower hydroxyalkyl ethers at C–3.

As further indicated in the equation hydrogenation in the presence of a hydrogenation catalyst preferably a palladium catalyst gives the corresponding 16-methylestrone. From this compound on conventional reduction with the same agents previously referred to there may be prepared the corresponding 16-methyl-estradiol. Further on conventional reaction with an alkali metal t-butoxide and acetylene the 16-methyl estrone gives the 16-methyl-17α-ethinyl-estradiol and upon conventional reaction with lower alkyl magnesium bromides the 16-methyl-17α-lower alkyl-estradiols. Further, partial hydrogenation of 16-methyl-17α-ethinyl-estradiol gave 16-methyl-17α-vinyl-estradiol. Except where a tertiary hydroxyl group is involved all of the hydroxyl groups were conventionally esterified in the manner previously referred to and ethers of the character previously referred to could be formed at C–3.

The following specific examples serve to illustrate, but are not intended to limit the present invention:

Example I

A mixture of 13.5 g. (0.05 mol) of estrone, 7.5 g. (0.25 mol) of paraformaldehyde, 25 g. (0.375 mol) of dry dimethylamine hydrochloride and 125 cc. of isoamyl alcohol was refluxed for 2 hours at the end of which the mixture was concentrated by distillation until most of the reaction product had precipitated. The precipitate was filtered from the cooled mixture, washed with ether and then stirred with 200 cc. of dilute (1:9) hydrochloric acid. The suspension was washed with ether, the aqueous phase was alkalinized by adding a saturated solution of sodium carbonate and the base thus liberated was extracted with chloroform. The extract was washed with water and concentrated until crystallization started. 100 cc. of methanol was added to the stirred hot mixture which was then cooled and the precipitate was collected, thus giving 16-(dimethylamino)-methyl-estrone.

A suspension of 15 gm. of 16-(dimethylamino)-methyl-estrone in 500 cc. of water was subjected to steam distillation until the distillate failed to give an alkaline reaction. The residue was cooled in an ice bath and the crystalline precipitate was collected by filtration. Recrystallization from acetone-hexane afforded the pure 16-methylene-estrone.

Example II 1.5 g. of 16-methylene-estrone, obtained in accordance with the previous example, was dissolved in 100 cc. of methanol and mixed with a solution of 1 g. of sodium borohydride in 30 cc. of water. After keeping the mixture for three hours at room temperature a few drops of acetic acid was added and then diluted with 10% sodium chloride solution. The precipitate was filtered, washed with water and crystallized from acetone-hexane, thus yielding 16-methylene-estradiol.

Example III

A solution of 5 g. of 16-methylene-estrone, obtained in accordance with Example I, in 50 cc. of ethanol containing 1 g. of previously reduced 5% palladium on charcoal catalyst, was stirred at room temperature and atmospheric pressure under an atmosphere of hydrogen until the equivalent of one mol of hydrogen had been absorbed. The catalyst was removed by filtration, the filtrate was evaporated to dryness and the residue crystallized from ether-hexane, thus producing 16-methyl-estrone.

Example IV 1 g. of 16-methyl-estrone dissolved in 80 cc. of methanol was treated with a solution of 0.7 g. of sodium borohydride in 20 cc. of water and then worked up as described in Example II. There was thus produced 16-methyl-estradiol.

Example V

A solution of 1 g. of 16-methyl-estrone in 100 cc. of thiophene free dry benzene was mixed under stirring with 5 cc. of a 4-normal solution of methyl magnesium bromide in anhydrous ether and the mixture was stirred for 16 hours under anhydrous conditions. It was then poured into an aqueous solution of ammonium chloride and stirred. The benzene layer was separated and the aqueous phase was extracted with ethyl acetate. The organic solutions were combined, washed with water, dried over anhydrous sodium sulfate and evaporated to dryness. Crystallization of the residue from ether-hexane produced 16,17α-dimethyl-estradiol.

Example VI

A solution of 3 g. of 16-methyl-estrone, obtained in accordance with Example III, in 120 cc. of anhydrous benzene was added under an atmosphere of nitrogen to a cooled solution of 3 g. of potassium metal in 150 cc. of tertiary butanol which had been prepared under a stream of nitrogen. Acetylene was then passed in for 40 hrs. After treatment with 600 cc. of dilute hydrochloric acid, removal of organic solvents by steam distillation, filtration of the precipitate and recrystallization from chloroform-methanol, 16-methyl-17α-ethinyl-estradiol was obtained.

Example VII

A solution of 2.5 g. of 16-methyl-17α-ethinyl-estradiol, obtained in accordance with the previous example, in 50 cc. of pure pyridine containing 0.4 g. of a previously reduced 2% palladium on calcium carbonate catalyst was hydrogenated under stirring at room temperature and atmospheric pressure. The hydrogenation was suspended after around 40 minutes when the equivalent of one mol of hydrogen had been absorbed. The catalyst was filtered, washed with a little pyridine and the filtrate was evaporated to dryness under vacuum. The residue was triturated with a little cold ether to produce 16-methyl-17α-vinyl-estradiol in crystalline form.

Example VIII

A solution of 1 g. of 16-methyl-17α-ethinyl-estradiol, obtained in accordance with Example VI, in 50 cc. of methanol containing 1 g. of a 2% palladium on charcoal catalyst was stirred under an atmosphere of hydrogen at room temperature and atmospheric pressure until the uptake of hydrogen ceased. The catalyst was filtered, washed with methanol and the filtrate was evaporated to dryness under vacuum. Crystallization of the residue from acetone-hexane yielded 16-methyl-17α-ethyl-estradiol.

Example IX

Hydrogenation of a methanol solution of 16-methyl-17α-vinyl-estradiol, obtained in accordance with Example VII, yielded 16-methyl-17α-ethyl-estradiol identical in properties to the one obtained in Example VIII.

Example X

A mixture of 1 g. of 16-methylene-estrone, 10 cc. of pyridine and 1 cc. of acetic anhydride was heated on the steam bath for 2 hours and then poured into ice water. The precipitate formed was collected, washed with water to neutral and crystallized from acetone-hexane, thus giving the acetate of 16-methylene-estrone.

Example XI

A solution of 1 g. of 16-methyl-estradiol, obtained in accordance with Example IV, in 10 cc. of pyridine was mixed with 2 g. of trimethylacetyl chloride (pivalic acid chloride) and the mixture was kept at room temperature for 36 hours. After pouring into water the mixture was kept for half an hour and then the precipitate was collected by filtration, washed with water to neutral, dried and recrystallized from acetone-hexane, thus giving the di-trimethylacetate of 16-methyl-estradiol.

Example XII

By analogous methods to those described in Examples X and XI and using the same or other corresponding acid anhydrides or chlorides, there can be prepared the same esters or other corresponding 2 to 12 carbon hydrocarbon carboxylic acid esters of 16-methyl-estrone, 16-methylene-estrone, the 3-esters of 17α-alkyl-16-methylene-estradiols and the diesters of 16-methyl and 16-methylene-estradiol. These esters were the propionates, cyclopentylpropionates, acetates, butyrates, trimethylacetates, phenylpropionates, benzoates and hemisuccinates.

Example XIII

A refluxing solution of 2 g. of 16-methyl-17α-ethinyl-estradiol, prepared in accordance with Example VI, in 50 cc. of ethanol was alternatively treated in the course of 10 minutes with 16 cc. of an aqueous solution of potassium hydroxide and 16 cc. of dimethyl sulfate which were added in 4 portions each. The reaction mixture was heated for 10 minutes further and then cooled and acidified with dilute hydrochloric acid. The precipitate was collected by filtration, washed with water, dried and crystallized from a mixture of acetone and hexane, thus yielding the 3-methyl ether of 16-methyl-17α-ethinyl-estradiol.

Example XIV

By an analogous method to that described in the previous example, and by reaction with dialkyl sulfates, there can be prepared the corresponding 3-ethers of 16-methyl-estrone, 16-methylene-estrone, 16-methyl-estradiol, 16-methylene-estradiol and of the 17α-alkyl-16-methyl-estradiol.

Example XV 0.23 g. of sodium metal was dissolved in 20 cc. of absolute ethanol and the still hot solution was mixed with 2.8 g. of 16-methyl-estrone and the mixture was evaporated to dryness under reduced pressure. The solid sodium salt of 16-methyl-estrone was suspended in 50 cc. of anhydrous toluene. 2.1 g. of sodium iodide was added, followed by the dropwise addition in the course of 2 hours of 1 cc. of bromoethanol which had been diluted with toluene. After the addition was complete the mixture was refluxed for 2 hours and then allowed to cool overnight. The mixture was evaporated to dryness under reduced pressure, the residue was dissolved in a mixture of ethanol-chloroform (2:1) and the solution was washed with dilute hydrochloric acid, water, potassium bicarbonate solution and water, dried and evaporated to dryness. Crystallization from ether-hexane yielded the hydroxyethyl ether of 16-methyl-estrone.

We claim:
1. The 3-lower hydroxyalkyl ethers of 16-methyl-estrone.
2. The hydrocarbon carboxylic acid esters of 2 to 12 carbon atoms of 16-methyl-17α-lower alkyl-estradiol.
3. The 3-lower hydroxyalkyl ethers of 16-methyl-17α-lower alkyl-estradiol.
4. The hydrocarbon carboxylic acid esters of 2 to 12 carbon atoms of 16-methyl-17α-vinyl-estradiol.
5. The 3-lower hydroxyalkyl ethers of 16-methyl-17α-vinyl-estradiol.
6. The 3-lower hydroxyalkyl ethers of 16-methyl-17α-ethinyl-estradiol.

(References on following page)

References Cited in the file of this patent

UNITED STATES PATENTS

| | | |
|---|---|---|
| 2,588,391 | Julian | Mar. 11, 1952 |
| 2,598,652 | Velluz et al. | May 27, 1952 |
| 2,666,769 | Colton | Jan. 19, 1954 |
| 2,857,405 | Stoeck et al. | Oct. 21, 1958 |
| 2,905,676 | Colton | Sept. 22, 1959 |
| 2,906,758 | Kincl et al. | Sept. 29, 1959 |

OTHER REFERENCES

Marrian et al.: J. Biochem., vol. 26, pages 25–31 (1932).

Hirschmann et al.: J. Biol. Chem., vol. 122, pages 303–21 (1938).

Kaufmann et al.: J.A.C.S., vol 72, pages 4531–4 (1950).

Djerassi et al.: J.A.C.S., vol. 72, pages 4534–40 (1950).

Wilds et al.: J.A.C.S., vol. 75, pages 5366–9 (1953).